J. V. PRATZNER.
COMBINED TIRE HOLDER AND TRUNK.
APPLICATION FILED SEPT. 12, 1911.
1,013,564.
Patented Jan. 2, 1912.
2 SHEETS—SHEET 1.
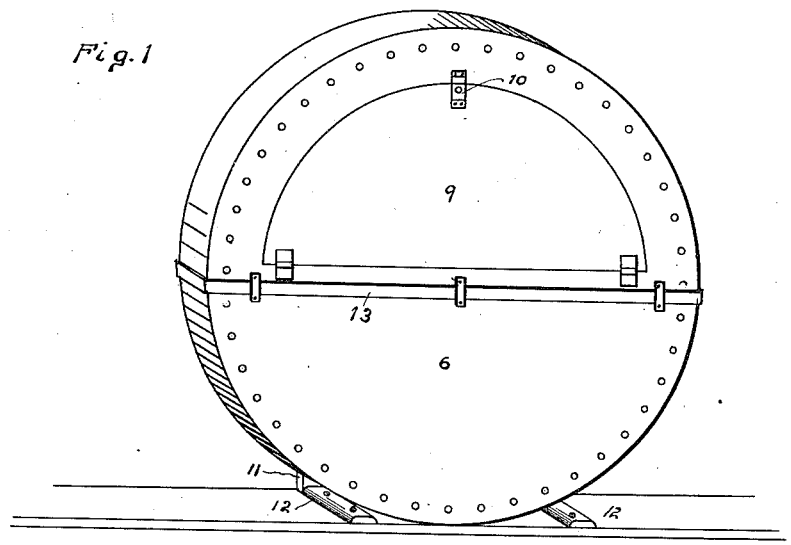
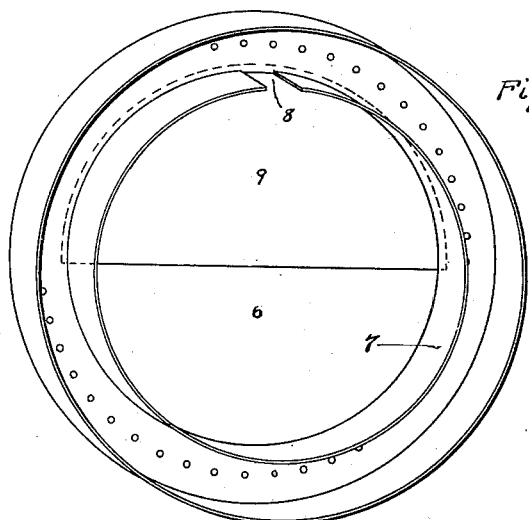
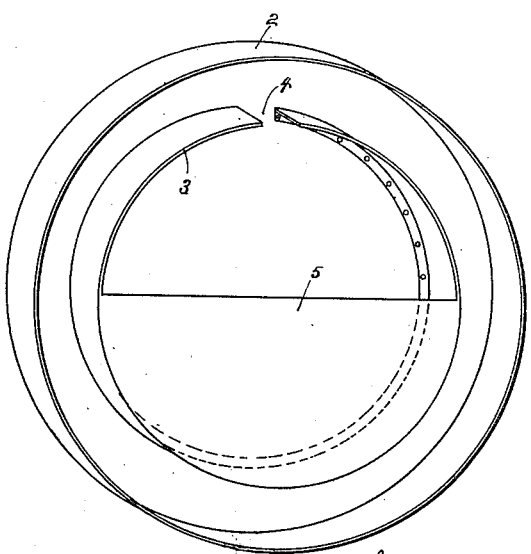
Witnesses
M. P. Nichols.
C. L. Weed
Inventor
Jules V. Pratzner
by Seymour Earle
atty J. V. PRATZNER.
COMBINED TIRE HOLDER AND TRUNK.
APPLICATION FILED SEPT. 12, 1911.
1,013,564.
Patented Jan. 2, 1912.
2 SHEETS—SHEET 2.
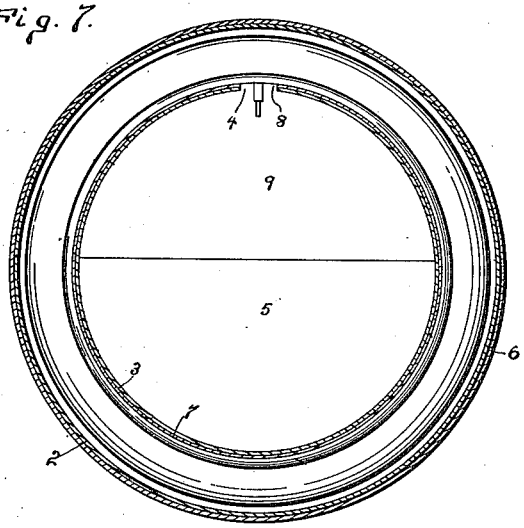
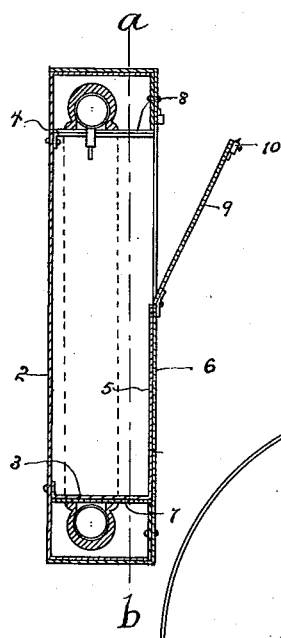
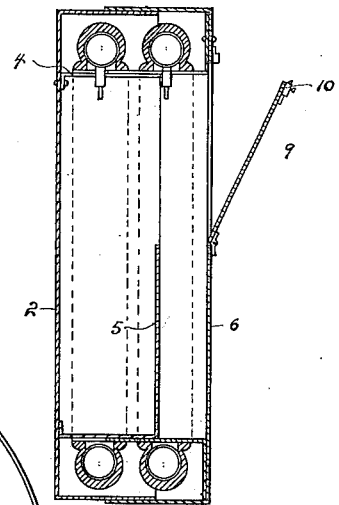
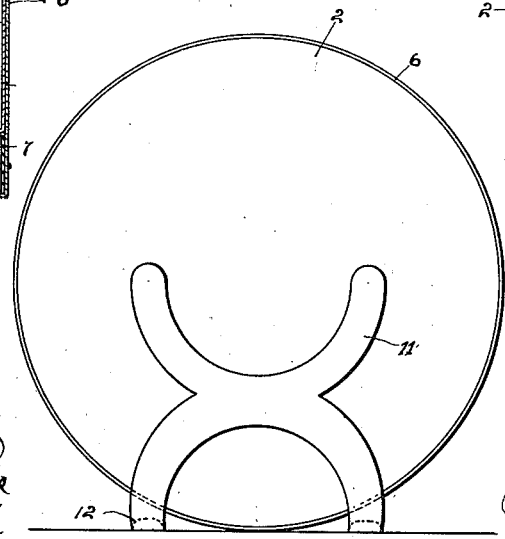

UNITED STATES PATENT OFFICE.

JULES V. PRATZNER, OF NEW HAVEN, CONNECTICUT.

COMBINED TIRE-HOLDER AND TRUNK.

1,013,564.

Specification of Letters Patent.

Patented Jan. 2, 1912.

Application filed September 12, 1911. Serial No. 648,950.

*To all whom it may concern:*

Be it known that I, JULES V. PRATZNER, a citizen of the United States, residing at New Haven, in the county of New Haven and State of Connecticut, have invented a new and useful Improvement in Combined Tire-Holders and Trunks; and I do hereby declare the following, when taken in connection with the accompanying drawings and the letters of reference marked thereon, to be a full, clear, and exact description of the same, and which said drawings constitute part of this specification, and represent, in—

Figure 1 a perspective view of a combined tire holder and trunk constructed in accordance with my invention. Fig. 2 a perspective view of the casing with the cover removed. Fig. 3 an inside view of the cover removed. Fig. 4 a rear view of the holder. Fig. 5 a sectional view showing the holder containing one tire. Fig. 6 a similar view showing the holder containing two tires. Fig. 7 a sectional view on the line *a—b* of Fig. 5.

This invention relates to an improvement in combined tire holder and trunk, that is, a device in which a spare tire may be carried and provision made for the reception of various articles commonly carried by automobiles, the object being a simple and convenient arrangement of parts whereby either one or two tires may be carried; and the invention consists in the construction hereinafter described and particularly recited in the claims.

In carrying out my invention I employ a round drum or casing 2 formed from fiber, wood or other suitable material and of a depth slightly greater than the width of one tire. In this casing is a concentric band 3 preferably formed at the top with a clearance slot 4 for the valves of automobile tires and extending across the lower half of this band is a plate 5 forming a receptacle for articles of clothing or anything else desired to be carried. In connection with this casing I employ a cover 6 corresponding in shape to the casing but slightly larger so that the edge of the cover will slip over the edge of the casing sliding thereon telescopically. Within the cover is a concentric band 7 corresponding to but slightly larger in diameter than the band 3 so as to fit over the outside of the band, and in this band is a notch 8 adapted to register with the notch 4 to clear the tire valve. In the upper portion of the cover and within the line of the band 7, I form a segmental opening which is adapted to be closed by a lid 9 which is adapted to be secured in its closed position by a latch or lock mechanism 10 of any approved construction. This holder is adapted to rest upon a running-board, and for this purpose a brace 11 is secured to the back, the brace having feet 12 which may be screwed to the running-board.

To hold the cover in place a strip or band 13 may be passed around the box and cover so as to prevent their separation, yet permit the cover to be removed when desired. When, as shown in Fig. 5, a single tire is to be carried, the cover will set over the box so as to entirely inclose the same and access to the chamber within the center of the box will be had through the lid 9 and so that articles may be placed in or removed from this chamber or container without disturbing the tire. If two tires are carried, as shown in Fig. 6 of the drawings, the cover will not pass entirely over the casing but be somewhat separated from it so as to provide space between the bottom of the casing and the cover for the two tires. When thus used access may be still had to the chamber in the casing through the lid 9, while the space between the cover and the casing provides additional space for the reception of any articles which it may be desired to carry, and access may be had to the chamber without exposing the tire or tires.

I claim:

1. A tire holder and trunk consisting of a casing having a concentric band within the same, combined with a cover adapted to fit telescopically over the casing and having a concentric band to fit over the band in the casing, an opening in the cover, and a lid to close the same.

2. A tire holder and trunk consisting of a casing having a concentric band within the same, a plate extending over the lower portion of the band forming a receptacle, combined with a cover adapted to fit telescopically over the casing, said cover formed with an opening in its upper portion, and a lid hinged to the cover and adapted to close said opening.

3. A tire holder and trunk consisting of a casing having a concentric band within the same, a plate extending over the lower portion of the band forming a receptacle, combined with a cover adapted to fit telescopically over the casing, said cover formed with a concentric band adapted to fit telescopically over the band in the casing, said cover also formed with a segmental opening within the circumference of the band, and a lid hinged to the cover and adapted to close said opening.

In testimony whereof, I have signed this specification in the presence of two subscribing witnesses.

JULES V. PRATZNER.

Witnesses:
FREDERIC C. EARLE,
CLARA L. WEED.